United States Patent [19]

Taguchi et al.

[11] Patent Number: 5,318,998
[45] Date of Patent: Jun. 7, 1994

[54] ACRYL-TYPE TWO-PART LIQUID ADHESIVE COMPOSITION

[75] Inventors: Kohichi Taguchi; Hiroshi Suto, both of Shibukawa, Japan

[73] Assignee: Denki Kagaku Kogyo Kabushiki Kaisha, Tokyo, Japan

[21] Appl. No.: 576,438

[22] PCT Filed: Apr. 4, 1990

[86] PCT No.: PCT/JP90/00451

§ 371 Date: Sep. 10, 1990

§ 102(e) Date: Sep. 10, 1990

[87] PCT Pub. No.: WO91/05828

PCT Pub. Date: May 2, 1991

[30] Foreign Application Priority Data

Oct. 20, 1989 [JP] Japan .................. 1-271748
Oct. 20, 1989 [JP] Japan .................. 1-271749
Oct. 20, 1989 [JP] Japan .................. 1-271750

[51] Int. Cl.$^5$ .......... C08F 2/48; C08G 12/02; C08G 18/72; C09J 175/16
[52] U.S. Cl. .................. 522/24; 522/28; 522/29; 522/94; 522/96; 525/518
[58] Field of Search ............ 522/94, 96, 24, 97, 522/182, 28, 29; 525/518

[56] References Cited

U.S. PATENT DOCUMENTS

| | | | |
|---|---|---|---|
| 3,591,438 | 7/1971 | Toback et al. | 525/518 |
| 4,340,453 | 7/1982 | Noomem | 522/94 |
| 4,367,280 | 1/1983 | Kondo et al. | 522/182 |
| 4,554,301 | 11/1985 | Dohi et al. | 525/63 |
| 4,596,857 | 6/1986 | Doi et al. | 522/92 |
| 4,656,229 | 4/1987 | Chiao | 525/518 |
| 4,963,220 | 10/1990 | Bachmann et al. | 525/518 |

FOREIGN PATENT DOCUMENTS 3444186 6/1985 Fed. Rep. of Germany .

OTHER PUBLICATIONS

Chemical Abstracts, vol. 102, No. 4, Jan. 28, 1985, (Columbus, Ohio, US), See p. 36, abstract 25560v, & JP, 59117572 (Okura Industrial Co., Ltd.) 1984.

Chemical Abstracts, vol. 101, No. 2, Jul. 9, 1984, (Columbus, Ohio, US), see p. 47, abstract 8350p, & JP, 5915459 (Cemedine Co., Ltd.) 1984.

*Primary Examiner*—Susan Berman
*Attorney, Agent, or Firm*—Oblon, Spivak, McClelland, Maier & Neustadt

[57] ABSTRACT

An adhesive composition comprising a first liquid containing (A) an acrylic compound selected from the group consisting of (meth)acrylic acids and esters thereof, and (B) a polymerization initiator selected from the group consisting of peroxy esters and hydroperoxides, and a second liquid containing (C) a condensation product of an amine and an aldehyde, and (D) a copper salt, wherein an acid phosphate compound of the following formula (I):

$$(R-O)_n-\overset{O}{\underset{\|}{P}}-(OH)_{3-n} \qquad (I)$$

wherein R is an alkyl group, an alkoxyalkyl group or a $CH_2=CR_1-CO(OR_2)_m-$ group, wherein $R_1$ is H or $CH_3$, $R_2$ is $-C_2H_4-$, $-C_3H_6-$, $$-CH_2CH-,\atop \underset{CH_3}{|}$$

$-C_4H_8-$, $-C_6H_{12}-$ or $$-C_2H_4-\underset{\underset{O}{\|}}{O}CC_5H_{10}-,$$

and m is an integer of from 1 to 10; and n is 1 or 2, is contained in the first liquid or in both the first and second liquids.

10 Claims, No Drawings

ACRYL-TYPE TWO-PART LIQUID ADHESIVE COMPOSITION

TECHNICAL FIELD

The present invention relates to an adhesive composition. More particularly, it relates to an adhesive composition of two-part liquid system useful particularly for bonding metallic parts or ceramic parts.

BACKGROUND TECHNIQUE

In recent years, there has been an increasing demand for quick-curing adhesives capable of being cured in a short period of time at room temperature, from the viewpoint of energy saving, labor saving, saving of resources, etc. As heretofore well known room temperature quick-curing adhesives, a quick-curing epoxy adhesive of two-part liquid system, an α-cyanoacrylate adhesive, an anaerobic adhesive and an acrylic adhesive of two-part liquid system may, for example, be mentioned.

Among these adhesives, the quick-curing epoxy adhesive of two-part liquid system is designed to be used by measuring and mixing two liquids i.e. a main agent and a curing agent. If the measurement or the mixing of the two liquids is not conducted adequately, it is likely that a substantial deterioration in the bonding strength will result. Further, even if the measurement and the mixing of the two liquids are adequately conducted, there still remain drawbacks such that the peel strength and impact strength are low and unsatisfactory.

The α-cyanoacrylate adhesive provides excellent operation efficiency, but is generally poor in the peel strength and impact strength and inferior in the heat resistance and moisture resistance. Therefore, its application field is very much limited. The anaerobic adhesive is an adhesive of the type which is cured by shutting off air by pressing it between objects to be bonded. Therefore, at the time of bonding, the adhesive is likely to be pressed out from the objects, and the adhesive at the portion which is in contact with air, such as the pressed out portion, will not be cured. Thus, the anaerobic adhesive will not be sufficiently cured, and deficient bonding is likely to result in a case of porous objects or in a case where the clearance between the objects is large.

The acrylic adhesive of two-part liquid system is generally called a second generation acrylic adhesive (SGA). It is of a two-part liquid system, but it has excellent operation efficiency in that it is unnecessary to accurately measure the two liquids, and it is capable of being cured quickly in from a few minutes to a few tens minutes by extremely rough measurement and mixing (in some cases, merely by contacting the two liquids). Yet, high peel strength and impact strength are obtainable, and the curing of the adhesive pressed out from the objects, is excellent. Therefore, adhesive of this type has been widely used. However, from the viewpoint of the energy saving, labor saving and saving of resources, there is an increasing demand for further shortening the curing time, which is presently from a few minutes to a few tens minutes at room temperature with such an acrylic adhesive of two-part liquid system.

Various proposals have been made to shorten the curing time of such an acrylic adhesive of two-part liquid system. For example, U.S. Pat. Nos. 4,348,503 and 4,429,088 disclose that an adhesive composed of a first liquid comprising an acrylic ester monomer, an aromatic perester, an organic acid and a transition metal, and a second liquid comprising an amine/aldehyde adduct activator, can be cured in a fixture time of 45 seconds.

Japanese Unexamined Patent Publication No. 199085/1985 discloses that also an adhesive composition comprising a certain specific urethane prepolymer, a (meth)acrylate monomer (referring generally to acrylates and methacrylates), a peroxy ester and an accelerator made of a compound which is capable of forming a redox system with the polymerization initiator of a peroxy ester, can be cured in a short fixture time within one minute.

Further, Japanese Unexamined Patent Publication No. 65277/1980 discloses that an adhesive composition having chlorosulfonated polyethylene and a certain specific acrylic monomer blended in certain specific proportions and comprising cumene hydroperoxide, an aldehyde-amine adduct activator and a transition metal introduced as any appropriate organic compound, can be cured in from 5 to 10 seconds.

On the other hand, it has been known to incorporate an acid phosphate compound to an acrylic adhesive in order to improve the adhesion to aluminum, stainless steel or chromated zinc coated steel parts. For example, Japanese Unexamined Patent Publication No. 132234/1976 discloses that an acid phosphate compound is incorporated to an anaerobic adhesive composition.

Further, U.S. Pat. Nos. 4,223,115 and 4,452,944 disclose that phosphorus compounds are incorporated to acrylic adhesives. However, U.S. Pat. No. 4,223,115 states that "the addition of phosphorus-containing compound to polymerizable acrylic adhesive compositions has a retarding effect which is directly proportional to the amount of such compound", and it is suggested that to solve such a problem, a tertiary amine having a certain specific structure is added to accelerate the curing.

Further, U.S. Pat. No. 4,731,146 discloses an improvement in adhesion for bonding metals such as aluminum and a curable primer solution in a volatile organic solvent of an acid phosphate compound and a certain specific metal salt. Also here, it is stated that phosphate compounds have been known as stabilizers for acrylic monomer compositions, and acid phosphate monomers have a cure inhibiting or slowing effect.

As described in the foregoing, quick-curing acrylic adhesives have been known, and acrylic adhesives having acid phosphate compounds incorporated to improve the adhesion for bonding metals, have been well known. However, since acid phosphate compounds have a cure slowing effect, there has been no adhesive having excellent adhesion to metals and simultaneously having a high curing speed.

SUMMARY OF THE INVENTION

Under these circumstances, the present inventors have conducted extensive researches and as a result, have found it possible to obtain an acrylic adhesive having excellent adhesive properties and quick-curing properties by using a (meth)acrylic monomer, a peroxy initiator, a condensation product of an amine and an aldehyde, a copper salt and an acid phosphate compound. The present invention has been accomplished on the basis of this discovery.

It is an object of the present invention to provide an acrylic adhesive composition of two-part liquid system having excellent adhesive properties and quick-curing properties.

The present invention provides an adhesive composition comprising a first liquid containing (A) an acrylic compound selected from the group consisting of (meth)acrylic acids and esters thereof, and (B) a polymerization initiator selected from the group consisting of peroxy esters and hydroperoxides, and a second liquid containing (C) a condensation product of an amine and an aldehyde, and (D) a copper salt, wherein an acid phosphate compound of the following formula (I):

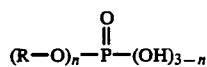

wherein R is an alkyl group, an alkoxyalkyl group or a $CH_2=CR_1-CO(OR_2)_m-$ group, wherein $R_1$ is H or $CH_3$, $R_2$ is $-C_2H_4-$, $-C_3H_6-$,

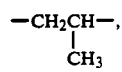

$-C_4H_8-$, $-C_6H_{12}-$ or

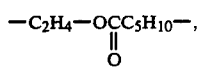

and m is an integer of from 1 to 10; and n is 1 or 2, is contained in the first liquid or in both the first and second liquids.

Now, the present invention will be described in detail.

The adhesive composition of the present invention is an adhesive composition of two-part liquid system comprising a first liquid and a second liquid.

The acrylic compound selected from the group consisting of (meth)acrylic acids (referring generally to acrylic acid and methacrylic acid) and esters thereof, as component A constituting the first liquid of the present invention, may be of any type so long as it is radical-polymerizable, and the following compounds may be mentioned as specific examples.

(1) A monomer represented by the formula $X-O-R_3$ wherein X is a (meth)acryloyl group, a $CH_2=CHCOOCH_2-CH(OH)CH_2-$ group or a $CH_2=C(CH_3)COOCH_2-CH(OH)CH_2-$ group, and $R_3$ is H, an alkyl group having from 1 to 20 carbon atoms, a cycloalkyl group, a benzyl group, a phenyl group, a tetrahydrofurfuryl group, a glycidyl group, an isobornyl group, a dicyclopentanyl group, a dicyclopentenyl group or a (meth)acryloyl group.

Such a monomer includes, for example, (meth)acrylic acid, methyl (meth)acrylate, cyclohexyl (meth)acrylate, benzyl (meth)acrylate, tetrahydrofurfuryl (meth)acrylate, isobornyl (meth)acrylate, dicyclopentanyl (meth)acrylate, dicyclopentenyl (meth)acrylate, glycerol (meth)acrylate and glycerol di-(meth)acrylate.

(2) A monomer represented by the formula $X-O-(R_4O)_p-R_3$ wherein X and $R_3$ are as defined above, $R_4$ is $-C_2H_4-$, $-C_3H_6-$,

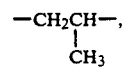

$-C_4H_8-$ or $-C_6H_{12}-$, and p is an integer of from 1 to 25.

Such a monomer includes, for example, 2-hydroxyethyl (meth)acrylate, 2-hydroxypropyl (meth)acrylate, ethoxyethyl (meth)acrylate, polyethylene glycol (meth)acrylate, phenoxyethyl (meth)acrylate, dicyclopentenyloxyethyl (meth)acrylate, phenoxydiethylene glycol (meth)acrylate, tripropylene glycol di(meth)acrylate and 1,6-hexanediol di-(meth)acrylate.

(3) A monomer represented by the formula:

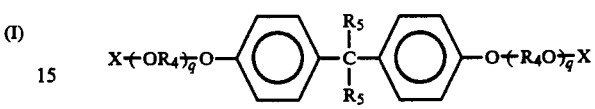

wherein X and $R_4$ are as defined above, $R_5$ is H or an alkyl group having from 1 to 4 carbon atoms, and q is an integer of from 0 to 8.

Such a monomer includes, for example, 2,2-bis(4-methacryloxyphenyl)propane, 2,2-bis(4-methacryloxyethoxyphenyl)propane, 2,2-bis(4-methacryloxydiethoxyphenyl)propane, 2,2-bis(4-methacryloxypropoxyphenyl)propane and 2,2-bis(4-methacryloxytetraethoxyphenyl)propane.

(4) A (meth)acrylate of a polyhydric alcohol which is not included in the above monomers (1), (2) and (3). Such a monomer includes, for example, trimethylol propane tri-(meth)acrylate, neopentyl glycol di-(meth)acrylate, pentaerythritol tetra-(meth)acrylate and dipentaerythritol hexa-(meth)acrylate.

(5) A urethane prepolymer having (meth)acryloyloxy groups. Such a monomer is obtainable, for example, by reacting a (meth)acrylate having a hydroxyl group, an organic polyisocyanate and a polyol. Here, specific examples of the (meth)acrylate having a hydroxyl group, include hydroxyethyl (meth)acrylate, hydroxypropyl (meth)acrylate and hydroxybutyl (meth)acrylate. Specific examples of the organic polyisocyanate include toluene diisocyanate, 4,4-diphenylmethane diisocyanate, hexamethylene diisocyanate and isopholone diisocyanate. Specific examples of the polyol include polyethylene glycol, polypropyrene glycol, polytetramethylene glycol and polyester polyol.

The above monomers may be used alone or in combination as a mixture of two or more different types. It is preferred that one of the monomers constituting component A is the urethane prepolymer having (meth)acryloyloxy groups as identified in (5).

With respect to the polymerization initiator selected from the group consisting of peroxyesters and hydroperoxides as component B, specific examples of the polymerization initiator selected from peroxy esters, include tert-butyl peroxybenzoate, tert-butyl peroxyacetate, tert-butyl peroxyisobutyrate and tert-butyl peroxyphthalate. Among them, tert-butyl peroxybenzoate is most preferred. Specific examples of the polymerization initiator selected from hydroperoxides, include cumene hydroperoxide, tert-butyl hydroperoxide, diisopropylbenzene hydroperoxide and p-menthane hydroperoxide. Among them, cumene hydroperoxide is most preferred.

Components A and B contained in the first liquid have been described in the foregoing. With respect to their proportions, it is preferred that component B is usually from 0.1 to 10 parts by weight, particularly from 1 to 7 parts by weight, per 100 parts by weight of component A.

To the first liquid containing the polymerization initiator selected from peroxy esters, an organic dibasic acid may be added. Specific examples of such an organic dibasic acid include maleic acid, itaconic acid and phthalic acid. Maleic acid is most preferred among them. The organic dibasic acid may be incorporated in an amount of from 0.05 to 7 parts by weight, particularly preferably from 0.5 to 5 parts by weight, per 100 parts by weight of component A.

Further, to the first liquid containing the polymerization initiator selected from peroxy esters, pyrogallol and/or a gallic acid derivative represented by the formula (II):

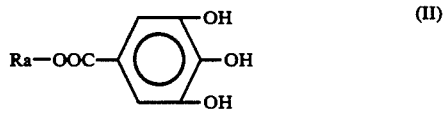

wherein $R_a$ is hydrogen or an alkyl group having from 1 to 18 carbon atoms, may be added to further improve the curing speed. Specific examples thereof include pyrogallol, gallic acid, methyl gallate, propyl gallate, dodecyl gallate and stearyl gallate. The amount of pyrogallol and/or the gallic acid derivative of the formula (II) is preferably from 0.05 to 5 parts by weight, more preferably from 0.1 to 3 parts by weight, per 100 parts by weight of component A.

It is further possible to incorporate a photopolymerization initiator to the first liquid. As such a photopolymerization initiator, any initiator commonly used, may be used without any particular restriction. However, benzil, benzophenone, benzoin ethyl ether or benzyl dimethyl ketal may, for example, be mentioned. The amount of the photopolymerization initiator is preferably from 0.05 to 7 parts by weight, more preferably from 0.5 to 5 parts by weight, per 100 parts by weight of the first liquid.

Now, components C and D constituting the second liquid will be described.

The condensation product of an amine and an aldehyde as component C may be, for example, the one obtained by reacting at least 1 mol, preferably from 1.5 to 3 mol, of an aldehyde to 1 mol of an amine at a temperature of from 40° to 70° C. in the presence of a carboxylic acid such as acetic acid or propionic acid, or an inorganic acid such as phosphoric acid or sulfuric acid.

As a specific example of the condensation product of an amine and an aldehyde, a condensation product of butyl amine or aniline and butyl aldehyde is commercially available and useful.

The condensation product of an amine and an aldehyde is usually in a liquid state or in a solid state, and may be used in either form. When the condensation product of an amine and an aldehyde is in a liquid state, it may be used as it is, or after being diluted with a solvent. When the condensation product of an amine and an aldehyde is in a solid state, it is dissolved in (and diluted with) a solvent for use, or it is dispersed in (and diluted with) a solvent for use.

The second liquid contains component C. When component C is in a liquid state, it may be used as it is as the second liquid. However, it is preferred that component C is dissolved or dispersed in a volatile organic solvent for use as the second liquid, as mentioned above, since components C and D contained in the second liquid will thereby be uniformly mixed, and the second liquid will be excellent in the handling and operation efficiency. The volatile organic solvent suitable for this purpose includes, for example, methylene chloride, trichloroethane, acetone, methyl ethyl ketone, ethyl acetate, toluene, methanol and ethanol.

The concentration of component C in the second liquid is preferably at least 1% by weight, more preferably at least 10% by weight.

The copper salt as component D is an organic or inorganic salt. For example, copper acetate, copper naphthenate, copper octenoate or an acetyl acetone copper complex may be mentioned.

The amount of component D is preferably from 10 to 10,000 ppm, more preferably from 50 to 1,000 ppm, as the concentration of copper itself in the second liquid.

The adhesive composition of the present invention is composed basically of an adhesive composition of two-part liquid system comprising the above-mentioned first and second liquids and is characterized in that an acid phosphate compound of the following formula (I):

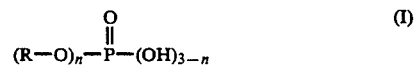

wherein R is an alkyl group, an alkoxyalkyl group or a $CH_2=CR_1-CO(OR_2)_m$-group, wherein $R_1$ is H or $CH_3$, $R_2$ is $-C_2H_4-$, $-C_6H_6-$,

$C_4H_8-$, $-C_6H_{12}-$ or

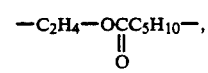

and m is an integer of from 1 to 10; and n is 1 or 2, is contained in the first liquid or in both the first and second liquids.

The acid phosphate compound of the formula (I) includes, for example, butyl acid phosphate, 2-ethylhexyl acid phosphate, butoxyethyl acid phosphate, acid phosphooxyethyl (meth)acrylate, acid phosphooxypropyl (meth)acrylate and bis(2-(meth)acryloyloxyethyl) phosphate. These acid phosphate compounds may be used alone or in combination as a mixture of two or more different types.

The acid phosphate compound is incorporated preferably in an amount of from 0.05 to 10 parts by weight, more preferably from 0.5 to 7 parts by weight, per 100 parts by weight of the first liquid, when it is incorporated in the first liquid. When the acid phosphate compound is incorporated in both the first and second liquids, it is incorporated preferably in an amount of from 0.05 to 10 parts by weight, more preferably from 0.5 to 7 parts by weight, per 100 parts by weight of each of the first and second liquids. When the acid phosphate compound is used within the above range, excellent effects for quick-curing and adhesive properties will be obtained. The acid phosphate compound may be used in an amount exceeding the above range i.e. exceeding 10 parts by weight. However, such is economically disadvantageous, although the effects for quick-curing and adhesive properties may be the same.

In the foregoing, the components contained in the first and second liquids of the adhesive composition of the present invention have been described. For the purpose of controlling the viscosity, a thickener or a thixotropic agent may be added, as the case requires. The thickener includes various synthetic rubbers such as nitrile-butadiene rubber and chlorosulfonated polyethylene, and various thermoplastic polymers such as a methyl methacrylate-butadiene-styrene copolymer and linear polyurethane. The thixotropic agent includes fine silica powder and fine hydrophobic silica powder.

As mentioned above, the adhesive composition of the present invention may contain a photopolymerization initiator in the first liquid so that when the adhesive is pressed between the objects to be bonded, the portion pressed out from the objects can be photo-cured by irradiation with ultraviolet rays. In order to cure a pressed out portion which can not be irradiated with ultraviolet rays, paraffin or the like may be incorporated.

Further, for the purpose of improving the storage stability, known additives such as various polymerization inhibitors or antioxidants may be added to the adhesive composition of the present invention. Further, a plasticizer, a filler or a coloring agent may also be added, as the case requires.

The adhesive composition of the present invention can be cured quickly in a short period of time by contacting the first and second liquids.

There is no particular restriction as to the proportions of the first and second liquids to be used. However, it is preferred to use the second liquid in an amount of from 5 to 10 parts by weight, per 100 parts by weight of the amount of the first liquid coated on the objects to be bonded.

As a method for bonding the objects to be bonded by using the adhesive composition of the present invention, it is preferred to employ a method wherein the first liquid is coated on one object, the second liquid is coated on the other object, when the second liquid contains a volatile organic solvent, the solvent is evaporated, and then the coated surfaces of the objects are brought in contact with each other for bonding, since the adhesive composition of the present invention has a high curing speed. In a case where an extra portion remains in this method where the first liquid and the second liquid are not in contact, a photopolymerization initiator may be added to the first liquid as the case requires, so that the extra portion may be cured by irradiation with ultraviolet rays.

The adhesive composition of the present invention may be applied in a wide range irrespective of the types of the objects to be bonded. However, it is particularly suitable for bonding metallic parts or ceramic parts. Among the metallic parts, it is particularly suitable for bonding steel, stainless steel, aluminum and its alloy or chromated zinc coated steel parts.

BEST MODE OF THE PRESENT INVENTION

Now, the adhesive composition of the present invention will be described in further detail with reference to Examples. However, it should be understood that the present invention is by no means restricted by such specific Examples.

Fixture time

The first liquid was coated on one of test specimens (100 mm in length×25 mm in width×1.6 mm in thickness, rolled steel treated by sandblasting) for measuring the tensile shear strength, and the second liquid was coated on the other test specimen. After evaporating the volatile organic solvent from the second liquid, the test specimens were bonded at 23° C. so that the overlapping portion of the coated surfaces of the specimens would have a size of 12.5 mm in length×25 mm in width, and the bonded specimens were pulled by a push-pull gauge, whereby the time until the tensile shear strength became at least 4 kg, was taken as the fixture time.

Tensile shear strength

In accordance with ASTM D-1002, the first liquid was coated on one of test specimens (100 mm in length×25 mm in width×1.6 mm in thickness (steel) or 2 mm in thickness (aluminum)) for measuring the tensile shear strength as the objects to be bonded and the second liquid was coated on the other test specimen. After evaporating the volatile organic solvent from the second liquid, the test specimens were bonded so that the overlapping portion would have a size of 12.5 mm in length and 25 mm in width and aged for 24 hours. Then, the tensile shear strength was measured by an Instron 1123 Model (crosshead speed: 10 mm/min).

T-peel strength

In accordance with ASTM D-1876, the first liquid was coated on one of test specimens (100 mm in length×25 mm in width×0.3 mm in thickness) for measuring the T-peel strength as the objects to be bonded, and the second liquid was coated on the other test specimen. After evaporating the volatile organic solvent from the second liquid, the test specimens were bonded so that the overlapping portion would have a size of 75 mm in length×25 mm in width and aged for 24 hours. The T-peel strength was measured by an Instron 1123 Model (crosshead speed: 50 mm/min).

Impact strength

In accordance with ASTM D-950, the first liquid was coated on one of steel test specimens (treated by sanding, 44 mm in length×25 mm in width×19 mm in thickness and 25 mm in length×25 mm in width×9 mm in thickness) as the objects to be bonded, and the second liquid was coated on the other test specimen. After evaporating the volatile organic solvent from the second liquid, the test specimens were bonded so that the overlapping portion would have a size of 25 mm in length×25 mm in width and aged for 24 hours. The impact strength was measured by an Izod impact tester.

EXAMPLES 1 TO 3 AND COMPARATIVE EXAMPLES 1 AND 2

The urethane prepolymer and acrylic compounds shown in Table 1 as component A, the polymerization initiator as component B and various acid phosphate compounds were mixed in the proportions as identified in Table 1, and MBS (a methyl methacrylate-butadiene-styrene copolymer) was further added as a thickener, to obtain the first liquid.

Nocceller 8 (tradename for n-butyl aldehyde aniline, manufactured by Ouchi Shinko Kagaku Kogyo K.K.) as component C, copper naphthenate (copper concentration: 5%) as component D, the acid phosphate compound and the solvent were mixed in the proportions as identified in Table 1, to obtain the second liquid.

The fixture times of the adhesive compositions of the Examples and Comparative Examples were measured, and the results are shown in Table 1.

It is evident from Table 1 that the catalyst system comprising the peroxy ester, the acid phosphate compound, the condensation product of an amine and an aldehyde and the copper salt, is effective for quick-curing.

Example for the preparation of urethane prepolymer UA-1

Into a reactor, about 50 g of toluene diisocyanate and about 0.03 g of dibutyltin laurate were charged. While maintaining the reaction temperature to a level of from 60° to 70° C., about 145 g of polytetramethylene glycol having a molecular weight of about 1,000 was gradually added under stirring. The mixture was reacted for about 1 hour while maintaining the temperature at a level of from 60° to 70° C. Then, about 75 g of 2-hydroxyethyl methacrylate was gradually added thereto, and the mixture was stirred for 3 hours. The temperature was raised to about 80° C., and the stirring was continued for 1 hour. Then, after confirming that no signal of NCO group was observed in the vicinity of 2,360 cm$^{-1}$ in the IR spectrum, the mixture was cooled to room temperature to obtain urethane prepolymer UA-1 having methacryloyl groups.

EXAMPLES 4 AND 5 AND COMPARATIVE EXAMPLE 3

UA-1 prepared in the Preparation Example and the acrylic compounds identified in Table 2, as component A, the polymerization initiator as component B, the organic dibasic acid, and the acid phosphate compound were mixed in the proportions as identified in Table 2, to obtain the first liquid.

Nocceller 8 (tradename for n-butylaldehyde aniline, manufactured by Ouchi Shinko Kagaku Kogyo K.K.) as component C, copper naphthenate (copper concentration: 5%) as component B, the acid phosphate compound and the solvent were mixed in the proportions as identified in Table 2, to obtain the second liquid.

The fixture times of the adhesive compositions of the Examples and Comparative Example, the tensile shear strength using aluminum substrates (A-5052, 100 mm in length×25 mm in width×2 mm in thickness), the T-peel strength using stainless steel substrates (SUS304, 100 mm in length×25 mm in width×0.3 mm in thickness) and the impact strength were measured, and the results are shown in Table 2.

It is evident in Table 2 that Comparative Example 3 representing an adhesive of a conventional catalyst system shows poor adhesion to aluminum or stainless steel although the fixture time is short, and thus the adhesive strength is poor as compared with the adhesives of Examples 4 and 5 of the present invention.

EXAMPLES 6 TO 8

The urethane prepolymer and acrylic compounds as identified in Table 3, as component A, the polymerization initiator as component B, pyrogallol and the gallic acid derivatives of the formula (II), various acid phosphate compounds are mixed in the proportions as identified in Table 3, and MBS (a methyl methacrylate-butadiene-sytrene copolymer) was further added as a thickener, to obtain the first liquid.

Nocceller 8 (tradename for n-butyl aldehyde aniline, manufactured by Ouchi Shinko Kagaku Kogyo K.K.) as component C, copper naphthenate (copper concentration: 5%) as component D, the acid phosphate compound and the solvent were mixed in the proportions as identified in Table 3, to obtain the second liquid.

The fixture times of the adhesive compositions of the Examples and were measured, and the results are shown in Table 3.

It is evident from Table 3 that the fixture times of the adhesive compositions of Examples 6 to 8 having pyrogallol or the gallic acid derivative of the formula (I) incorporated are shorter than the adhesive of Example 1.

EXAMPLE 9 AND COMPARATIVE EXAMPLE 4

Component A, Component B, the acid phosphate compound and MBS were mixed in the proportions as identified in Table 4, to obtain the first liquid. Component C, Component D and the acid phosphate compound were mixed in the proportions as identified in Table 4, to obtain the second liquid.

The fixture times of the adhesive compositions of the Example and Comparative Example, the tensile shear strength using steel substrates (rolled steel the bonding surface treated by sanding, 100 mm in length×25 mm in width×1.6 mm in thickness), the T-peel strength using steel substrates (cold rolled carbon steel the bonding surface treated by sanding, 100 mm in length×25 mm in width×0.3 mm in thickness) and stainless steel substrates and the impact strength were measured, and the results are shown in Table 4.

It is evident from Table 4, the adhesive compositions of the present invention are excellent in the adhesion to the objects to be bonded and quick in curing.

EXAMPLES 10 TO 12 AND COMPARATIVE EXAMPLES 5 TO 6

The urethane prepolymer and acrylic compounds identified in Table 5, as component A, the polymerization initiator as component B and various acid phosphate compounds were mixed in the proportions as identified in Table 5, and MBS (a methyl methacrylate-butadiene-styrene copolymer) was further added as a thickener, to obtain the first liquid.

Nocceller 8 (tradename for n-butyl aldehyde aniline, manufactured by Ouchi Shinko Kagaku Kogyo K.K.) as component C, copper naphthenate (copper concentration: 5%) as component D, the acid phosphate compound and the solvent were mixed in the proportions as identified in Table 5, to obtain the second liquid.

The fixture times of the adhesive composition of the Examples and Comparative Examples were measured, and the results are shown in Table 5.

It is evident from Table 5 that the catalyst system comprising the hydroperoxide, the acid phosphate compound, the reaction condensate of an amine with an aldehyde and the copper salt is effective for quick-curing.

EXAMPLE 13 AND COMPARATIVE EXAMPLE 7

Component A, Component B, the acid phosphate compound and MBS were mixed in the proportions as identified in Table 6, to obtain the first liquid. Component C, Component D and the acid phosphate compound were mixed in the proportions as identified in Table 6, to obtain the second liquid. The fixture times of the adhesive compositions of the Example and Comparative Example, the tensile shear strength using steel substrates, the T-peel strength using steel substrates, and the impact strength were measured, and the results are shown in Table 6.

It is evident from Table 6 that the adhesive compositions of the present invention are excellent in the adhesion to the objects to be bonded and quick in curing.

EXAMPLE 14 AND COMPARATIVE EXAMPLE 8

To 100 parts by weight of the first liquid of the adhesive composition of Example 1, 1 part by weight of benzyl dimethyl ketal was added as a photopolymerization initiator and dissolved to obtain the composition of the first liquid. The second liquid of Example 1 was coated on the bonding surface of one of steel test specimens for measuring the tensile shear strength so that it does not spread beyond the bonding surface, and the above first liquid composition was coated on the other test specimen. The test specimens were bonded so that the first liquid was pressed out, and the pressed out portion was irradiated with ultraviolet rays (Toscure 400, manufactured by Toshiba Corporation, lamp output: 80 W/cm, irradiation distance: 15 cm) for 10 seconds, whereupon the pressed out portion was cured, and the surface of the cured product was completely tack-free when touched with a finger.

When the same test specimen was not irradiated with ultraviolet rays, tackiness remained on the surface of the pressed out portion or such a portion remained to be non-cured, even after expiration of one day.

EFFECTS OF THE INVENTION

As described in the foregoing, the adhesive composition of the present invention is very quick in the curing reaction at room temperature and excellent in the adhesion to metals. Therefore, with use of the adhesive composition of the present invention, it is possible to shorten the production line containing a bonding step and to make the production efficient. Thus, the usefulness of the present invention for industrial application is significant.

TABLE 1

| | Components | Names | Example 1 | Example 2 | Example 3 | Comparative Example 1 | Comparative Example 2 |
|---|---|---|---|---|---|---|---|
| First liquid | A | Art resin UN-6060 (*1) | 26 | 26 | 26 | 26 | 26 |
| | | Isobornyl acrylate | 35 | 35 | 35 | 35 | 35 |
| | | 2-Hydroxyethyl methacrylate | 26 | 26 | 26 | 26 | 26 |
| | B | tert-Butyl peroxybenzoate | 4 | 4 | 4 | 4 | 4 |
| | Acid phosphate compounds | Butyl acid phopshate | | | 4 | | |
| | | Acid phosphooxyethyl methacrylate | | 4 | | | |
| | | Bis(2-methacryloyloxyethyl) phosphate | 4 | | | | 4 |
| | Other | BTA IIIN2 (*2) | 20 | 20 | 20 | 20 | 20 |
| Second liquid | C | Nocceller 8 (*3) | 50 | 50 | 50 | 50 | 50 |
| | D | Copper naphthenate (copper content 5%) | 0.5 | 0.5 | 0.5 | 0.5 | |
| | Acid phosphate compound | Bis(2-methacryloyloxyethyl) phosphate | | | | 3 | |
| | Solvent | Acetone | 50 | 50 | 50 | 50 | 50 |
| Fixture time (sec.) | | | 40 | 70 | 60 | 135 | 225 |

(*1): Bisphenol A ethyleneoxide-modified urethane prepolymer, manufactured by Negami Kogyo K.K.
(*2): MBS, manufactured by Kureha Chemical Industries Co., Ltd.
(*3): n-Butylaldehyde aniline, manufactured by Ouchi Shinko Kagaku Kogyo K.K.

TABLE 2

| | Components | Names | Example 4 | Example 5 | Comparative Example 3 |
|---|---|---|---|---|---|
| First Liquid | A | UA-1 | 32 | | 32 |
| | | Light ester 3002M (*4) | | 40 | |
| | | 2-Hydroxyethyl methacrylate | 60 | 60 | 60 |
| | | Phenoxyethyl methacrylate | 8 | | 8 |
| | B | tert-Butyl peroxybenzoate | 4 | 4 | 4 |
| | Organic dibasic acid | Maleic acid | 1.5 | 1.0 | 1.5 |
| | Acid phosphate compound | Bis(2-methacryloyloxyethyl) phosphate | 5 | 5 | |
| Second liquid | C | Nocceller 8 (*3) | 30 | 30 | 30 |
| | D | Copper naphthenate (copper content: 5%) | 0.5 | 0.5 | 0.5 |
| | Solvent | Methanol | 70 | 70 | 70 |
| Fixture time (sec.) | | | 30 | 60 | 30 |
| Aluminum tensile shear strength (kg/cm$^2$) | | | 117 | 121 | 34 |
| Stainless steel T-peel strength (kg/25 mm) | | | 6.4 | 5.4 | 1.9 |
| Impact strength (kgcm/cm$^2$) | | | 37.3 | 15.7 | 39.2 |

(*3): See Table 1
(*4): Bisphenol A-modified epoxy acrylate, manufactured by Kyoeisha Yushi Kogyo K.K.

TABLE 3

| | Components | Names | Proportions (parts by weight) | | |
|---|---|---|---|---|---|
| | | | Example 6 | Example 7 | Example 8 |
| First liquid | A | Art resin UN-6060 (*1) | 26 | 26 | 26 |
| | | Isobornyl acrylate | 35 | 35 | 35 |
| | | 2-Hydroxyethyl methacrylate | 26 | 26 | 26 |
| | B | tert-Butyl peroxybenzoate | 4 | 4 | 4 |
| | Compound of the formula (II) | Pyrogallol | 1.5 | | |
| | | Gallic acid | | 1.5 | |
| | | Propyl gallate | | | 1.5 |
| | Acid phosphate compounds | Bis(2-methacryloyloxyethyl) phosphate | | 4 | 4 |
| | | Butyl acid phosphate | 4 | | |
| | Other | BTA IIIN2 (*2) | 20 | 20 | 20 |
| Second liquid | C | Nocceller 8 (*3) | 50 | 50 | 50 |
| | D | Copper naphthenate (copper content 5%) | 0.5 | 0.5 | 0.5 |
| | Acid phosphate compound | Bis(2-methacryloyloxyethyl) phosphate | 4 | | |
| | Solvent | Acetone | 50 | 50 | 50 |
| Fixture time (sec.) | | | 30 | 30 | 30 |

(*1): See Table 1
(*2): See Table 1
(*3): See Table 1

TABLE 4

| | Components | Names | Proportions (parts by weight) | |
|---|---|---|---|---|
| | | | Example 9 | Comparative Example 4 |
| First liquid | A | Art resin UN-2500 (*5) | 43 | 43 |
| | | 2-Hydroxyethyl methacrylate | 43 | 43 |
| | B | tert-Butyl peroxybenzoate | 4 | 4 |
| | Acid phosphate compound | Bis(2-methacryloyloxyethyl) phosphate | 4 | |
| | Other | BTA IIIN2 (*2) | 14 | 14 |
| Second liquid | C | Nocceller 8 (*3) | 50 | 50 |
| | D | Copper naphthenate (copper content: 5%) | 0.5 | |
| | Acid phosphate compound | Bis(2-methacryloyloxyethyl) phosphate | 3 | |
| | Solvent | Acetone | 50 | 50 |
| Fixture time (sec.) | | | 30 | 210 |
| Tensile shear strength (kg/cm$^2$) | | | 249 | 232 |
| T-peel strength (kg/25 mm) | | | 9.8 | 5.6 |
| Stainless steel T-peel strength (kg/25 mm) | | | 6.0 | 0.2 |
| Impact strength (kgcm/cm$^2$) | | | 44 | 37 |

(*2): See Table 1
(*3): See Table 1
(*5): Polyester-modified urethane prepolymer, manufactured by Negami Kogyo K.K.

TABLE 5

| | Components | Names | Proportions (parts by weight) | | | | |
|---|---|---|---|---|---|---|---|
| | | | Example 10 | Example 11 | Example 12 | Comparative Example 5 | Comparative Example 6 |
| First liquid | A | Art resin UN-6060 (*1) | 26 | 26 | 26 | 26 | 26 |
| | | Isobornyl acrylate | 35 | 35 | 35 | 35 | 35 |
| | | 2-Hydroxyethyl methacrylate | 26 | 26 | 26 | 26 | 26 |
| | B | Cumene hydroperoxide | 4 | 4 | 4 | 4 | 4 |
| | Acid phosphate compounds | Butyl acid phopshate | 4 | | | | |
| | | Acid phosphooxyethyl methacrylate | | 4 | | | |
| | | Bis(2-methacryloyloxyethyl) phosphate | | | 4 | | 4 |
| | Other | BTA IIIN2 (*2) | 20 | 20 | 20 | 20 | 20 |
| Second liquid | C | Nocceller 8 (*3) | 50 | 50 | 50 | 50 | 50 |
| | D | Copper naphthenate (copper content 5%) | 0.5 | 0.5 | 0.5 | 0.5 | |
| | Acid phosphate compound | Bis(2-methacryloyloxyethyl) phosphate | | | | 4 | |
| | Solvent | Acetone | 50 | 50 | 50 | 50 | 50 |

TABLE 5-continued

| | | Proportions (parts by weight) | | | | |
|---|---|---|---|---|---|---|
| Components | Names | Example 10 | Example 11 | Example 12 | Comparative Example 5 | Comparative Example 6 |
| Fixture time (sec.) | | 55 | 70 | 60 | 120 | 300 |

(*1): See Table 1
(*2): See Table 1
(*3): See Table 1

TABLE 6

| | | | Proportions (parts by weight) | |
|---|---|---|---|---|
| Components | | Names | Example 13 | Comparative Example 7 |
| First liquid | A | Art resin UN-2500 (*5) | 43 | 43 |
| | | 2-Hydroxyethyl methacrylate | 43 | 43 |
| | B | Cumene hydroperoxide | 4 | 4 |
| | Acid phosphate compound | Bis(2-methacryloyloxyethyl) phosphate | 4 | |
| | Other | BTA IIIN2 (*2) | 14 | 14 |
| Second liquid | C | Nocceller 8 (*3) | 50 | 50 |
| | D | Copper naphthenate (copper content: 5%) | 0.5 | |
| | Acid phosphate compound | Bis(2-methacryloyloxyethyl) phosphate | 4 | 4 |
| | Solvent | Acetone | 50 | 50 |
| Fixture time (sec.) | | | 45 | 115 |
| Tensile shear strength (kg/cm²) | | | 204 | 194 |
| T-peel strength (kg/25 mm) | | | 8.8 | 8.1 |
| Impact strength (kgcm/cm²) | | | 22 | 21 |

(*2): See Table 1
(*3): See Table 1
(*5): See Table 5

We claim:

1. An adhesive composition comprising a first liquid containing (A) an acrylic compound selected from the group consisting of (meth)acrylic acids and esters thereof, and (B) a polymerization initiator selected from the group consisting of peroxy esters and hydroperoxides, and a second liquid containing (C) a condensation product of an amine and an aldehyde, and (D) a copper salt, wherein an acid phosphate compound of the following formula (I):

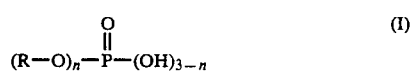

wherein R is an alkyl group, an alkoxyalkyl group or a $CH_2\!=\!CR_1\!-\!CO(OR_2)_m\!-$ group, wherein $R_1$ is H or $CH_3$, $R_2$ is $-C_2H_4-$, $-C_3H_6-$,

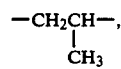

$-C_4H_8-$, $-C_6H_{12}-$ or

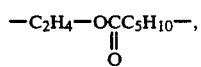

and m is an integer of from 1 to 10; and n is 1 or 2, is contained in the first liquid or in both the first and second liquids.

2. The adhesive composition according to claim 1 wherein the acid phosphate compound of the formula (I) is acid phosphooxyethyl (meth)acrylate and/or bis(2-(meth)acryloyloxyethyl) phosphate.

3. The adhesive composition according to claim 1, wherein the polymerization initiator contained in the first liquid is tert-butyl peroxybenzoate.

4. The adhesive composition according to claim 2, wherein the polymerization initiator contained in the first liquid is selected from the group consisting of peroxy esters, and an organic dibasic acid is contained in the first liquid.

5. The adhesive composition according to claim 3, wherein pyrogallol and/or a gallic acid derivative of the formula (II):

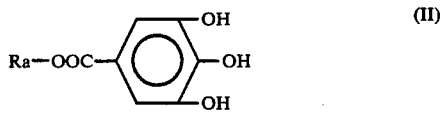

wherein Ra is a hydrogen atom or an alkyl group having from 1 to 18 carbon atoms, is contained in the first liquid.

6. The adhesive composition according to claim 1, wherein the polymerization initiator contained in the first liquid is cumene hydroperoxide.

7. The adhesive composition according to claim 1, wherein a photopolymerization initiator is contained in the first liquid.

8. The adhesive composition of claim 1, wherein said copper salt is an organic salt.

9. The adhesive composition of claim 8, wherein said organic salt is selected from the group consisting of copper acetate, copper naphthenate, copper octenoate, and acetyl acetone copper.

10. The adhesive composition of claim 1, wherein said copper salt is an inorganic salt.

* * * * *